(12) United States Patent
Park

(10) Patent No.: US 9,220,032 B2
(45) Date of Patent: Dec. 22, 2015

(54) METHODS AND ARRANGEMENTS FOR TRAFFIC INDICATION MAPPING IN WIRELESS NETWORKS

(71) Applicant: Intel Corporation, Santa Clara, CA (US)

(72) Inventor: Minyoung Park, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 130 days.

(21) Appl. No.: 13/730,960

(22) Filed: Dec. 29, 2012

(65) Prior Publication Data

US 2014/0056232 A1     Feb. 27, 2014

Related U.S. Application Data

(60) Provisional application No. 61/693,248, filed on Aug. 24, 2012.

(51) Int. Cl.
*H04W 28/02* (2009.01)
*H04W 72/12* (2009.01)
*H04L 29/06* (2006.01)
H04W 68/02 (2009.01)
H04L 12/16 (2006.01)
H04L 12/801 (2013.01)

(52) U.S. Cl.
CPC ....... *H04W 28/0263* (2013.01); *H04L 29/0653* (2013.01); *H04W 72/1289* (2013.01); *H04L 12/16* (2013.01); *H04L 47/12* (2013.01); *H04W 68/02* (2013.01); *Y02B 60/50* (2013.01)

(58) Field of Classification Search
None
See application file for complete search history.

(56) References Cited

U.S. PATENT DOCUMENTS

| | | |
|---|---|---|
| 2007/0258356 A1 | 11/2007 | Joung et al. |
| 2009/0006792 A1* | 1/2009 | Federwisch et al. ........... 711/162 |
| 2009/0016306 A1 | 1/2009 | Wang et al. |
| 2010/0110962 A1 | 5/2010 | Igarashi et al. |
| 2010/0142426 A1 | 6/2010 | Taniuchi et al. |
| 2010/0265864 A1 | 10/2010 | He et al. |
| 2012/0063335 A1 | 3/2012 | Cho et al. |
| 2013/0229959 A1* | 9/2013 | Ghosh et al. .................. 370/311 |

(Continued)

FOREIGN PATENT DOCUMENTS

| | | |
|---|---|---|
| WO | 2013/052076 A1 | 4/2013 |
| WO | 2013/066363 A1 | 5/2013 |
| WO | 2014/031239 A1 | 2/2014 |

OTHER PUBLICATIONS

Zhongyi, et al., "TIM Enhancement With Group Bits", IEEE 802.11-12/0325r0, Mar. 12, 2012, 10 pages.

(Continued)

*Primary Examiner* — Kodzovi Acolatse
(74) *Attorney, Agent, or Firm* — Schubert Law Group PLLC

(57) ABSTRACT

Logic may implement a hierarchical data structure for traffic indication mapping to facilitate transmissions for wireless communications devices. MAC sublayer logic may generate and transmit or receive and interpret management frames such as beacon frames with a partial virtual bitmap in a traffic indication map element based upon the hierarchical data structure for traffic indication mapping. The traffic indication map element may comprise a number of contiguous blocks encoded with the same encoding scheme, allowing the number of contiguous blocks to be included in the TIM element without repeating a block offset field value and a block control field value for each of the contiguous blocks.

29 Claims, 8 Drawing Sheets

(56) References Cited

U.S. PATENT DOCUMENTS

2013/0294261 A1* 11/2013 Ghosh et al. .................. 370/252
2014/0204960 A1 7/2014 Park et al.
2015/0029933 A1 1/2015 Park et al.

OTHER PUBLICATIONS

Park, Minyoung, "Proposed Specification Framework for TGah", IEEE 802.11-11/1137r10, Jul. 18, 2012, 30 pages.

Park, et al., "TGah Efficient TIM Encoding", IEEE 802.11-12/388r2, May 14, 2012, 32 pages.

Park, et al., "TGah TIM Operation", IEEE 802.11-12/117r0, Jan. 16, 2012, 10 pages.

International Search Report and Written Opinion received for PCT Patent Application No. PCT/US2013/048820, mailed on Oct. 18, 2013, 13 pages.

International Preliminary Report on Patentability and Written Opinion received for PCT Patent Application No. PCT/US2013/048820, mailed on Mar. 5, 2015, 10 pages.

International Search Report and Written Opinion received for PCT Patent Application No. PCT/US2011/068258, mailed on Oct. 31, 2012, 10 pages.

International Preliminary Report on Patentability (Chapter I) received for PCT Patent Application No. PCT/US2011/068258, mailed Apr. 8, 2014, 7 pages.

International Search Report and Written Opinion received for PCT Patent Application No. PCT/US2011/068259, mailed on Nov. 29, 2012, 9 pages.

International Preliminary Report on Patentability (Chapter I) received for PCT Patent Application No. PCT/US2011/068259, mailed on May 6, 2014, 5 pages.

* cited by examiner

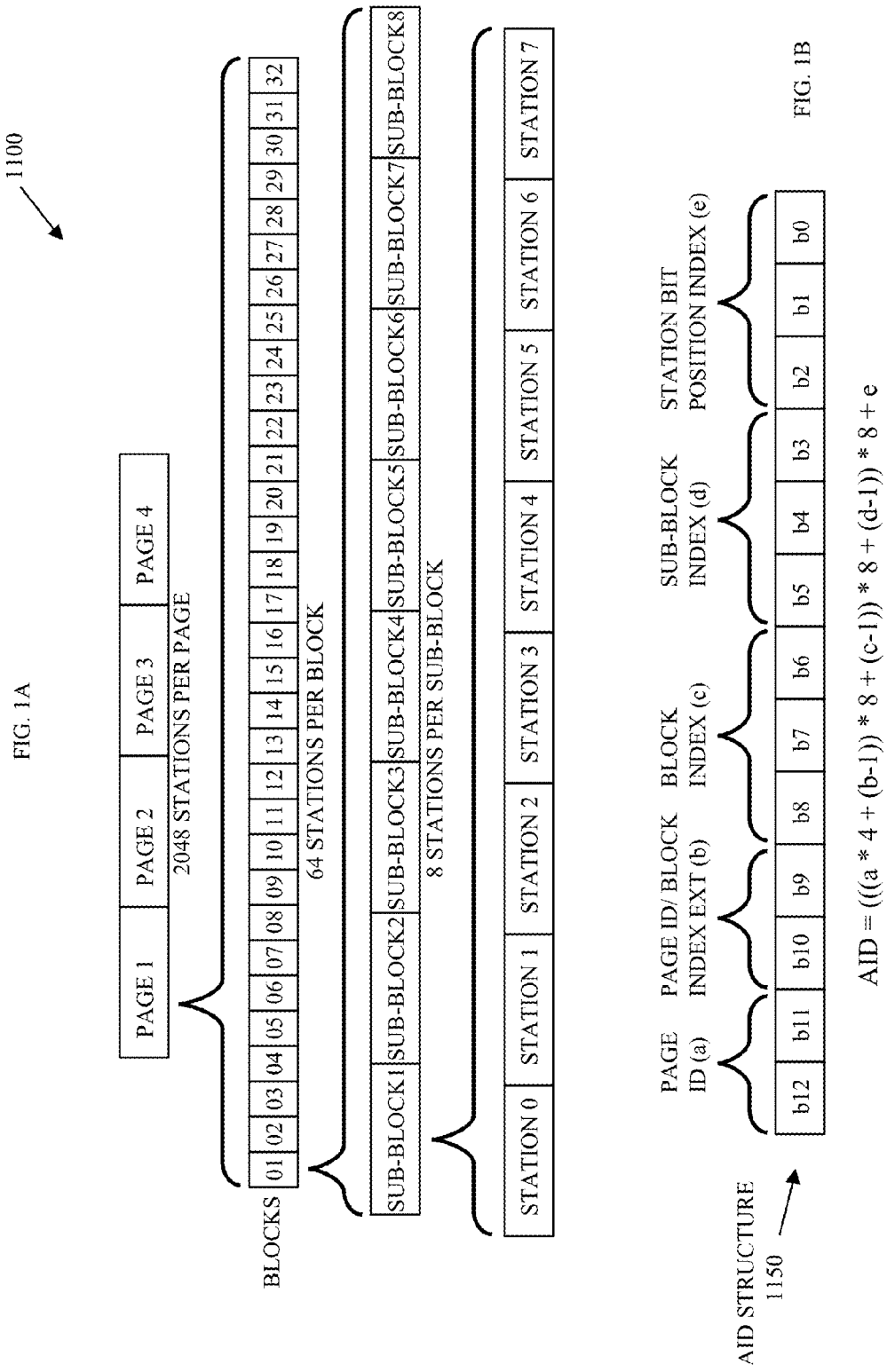

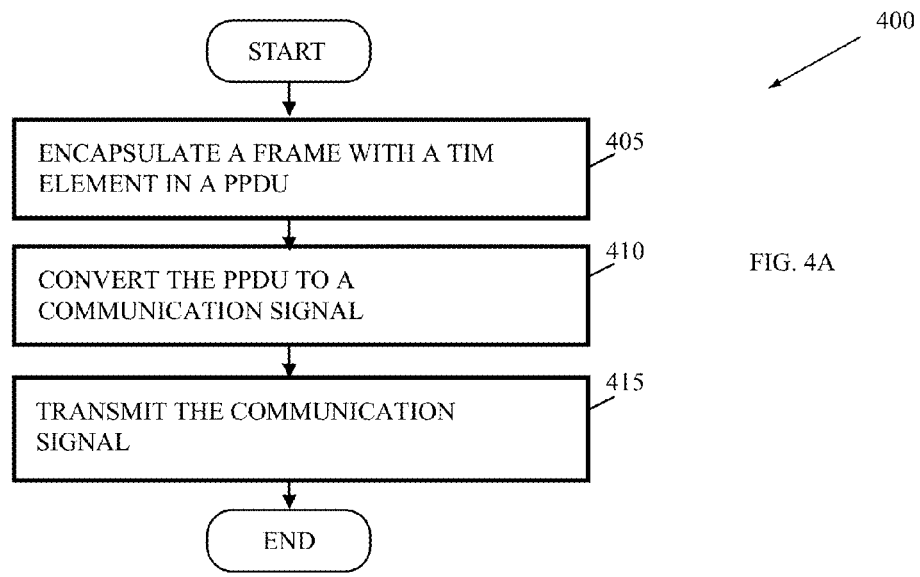

METHODS AND ARRANGEMENTS FOR TRAFFIC INDICATION MAPPING IN WIRELESS NETWORKS

BACKGROUND

Embodiments are in the field of wireless communications. More particularly, the present disclosure relates to communicating content of a contiguous number of blocks of a traffic indication map.

BRIEF DESCRIPTION OF THE DRAWINGS

FIG. 1A depicts an embodiment of a hierarchical data structure for traffic indication mapping;

FIG. 1B depicts an embodiment of an association identifier structure for the hierarchical data structure illustrated in FIG. 1A;

FIG. 1I depicts an embodiment of a hierarchical data structure for a bitmap control field and a partial virtual bitmap for a traffic indication map element;

FIGS. 4A-B depict embodiments of flowcharts to transmit, receive, and interpret communications with frames having partial virtual bitmaps based upon a hierarchical data structure for traffic indication mapping as illustrated in FIG. 2.

DETAILED DESCRIPTION OF EMBODIMENTS

Figure 1:
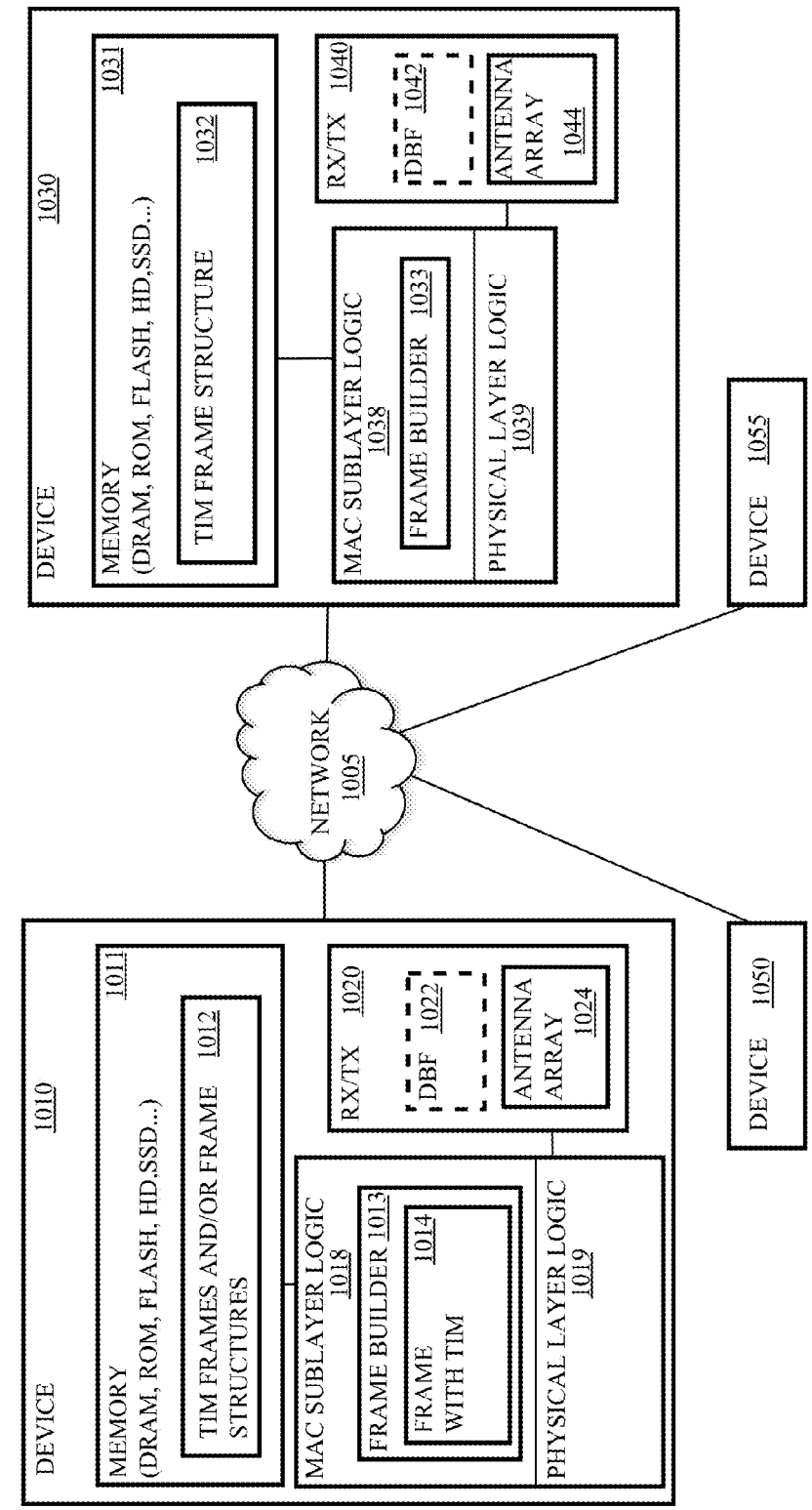
FIG. 1 depicts an embodiment of a wireless network comprising a plurality of communications devices, including multiple fixed or mobile communications devices.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Embodiments may implement a hierarchical data structure for traffic indication mapping to facilitate transmissions for wireless communications devices. Many embodiments comprise medium access control (MAC) logic to generate and transmit management frames such as beacon frames with a partial virtual bitmap based upon the hierarchical data structure for traffic indication mapping. In many embodiments, the hierarchical data structure for traffic indication mapping may describe stations assigned to a sub-block, more than one sub-blocks of stations assigned to a blocks, and more than one blocks of stations assigned to a page of more than one pages of stations.

In many embodiments, the AP may compress and/or reduce the amount of data in the partial virtual bitmap of the traffic indication map (TIM) element. In several embodiments, the hierarchical data structure for traffic indication mapping may take into account the occurrence of multiple contiguous blocks in the partial virtual bitmap and reduce overhead, i.e., the amount of data in a traffic indication map, associated with the inclusion of contiguous blocks. In some embodiments, reducing/compressing the data may involve removing repetitions of the block offset field and the block control field and including a field indicating the number of contiguous blocks. In some embodiments, the amount of data may be reduce/compressed by referencing sub-blocks in a block bitmap and including or excluding the sub-blocks within the partial virtual bitmap based upon the content of the sub-blocks.

In many embodiments, the blocks and sub-blocks may be encoded with an encoding scheme. For instance, some embodiments implement block bitmap encoding in which the content of each sub-block of a block may be included or excluded depending upon the content of the sub-block. The block bitmap encoding encodes block as block bitmaps, wherein the n-th bit position of a block bitmap may indicate whether the n-th sub-block bitmap is present in a sub-block field and the m-th bit position of the sub-block bitmap indicates whether the m-th station (STA) has data buffered at the AP.

In several embodiments, the blocks and sub-blocks may be encoded with a single AID encoding scheme. For instance, if a block comprises only one sub-block with one STAs bit set, the single AID encoding may compress the content of the block to 6 bits of the Block Bitmap field that is used to indicate the AID of the single station with the set bit. In such encodings, the sub-block field included in the partial virtual bitmap of the TIM element.

In some embodiments, an inverse bitmap may be encoded to compress the content of the blocks. For instance, some blocks may only include sub-blocks that include at least one bit that is a logical one. Other blocks may be inverted and only include sub-blocks that include at least one bit that is a logical zero. In many embodiments, inverting such indications may compress the data transmitted in the TIM element.

Various embodiments may be designed to address different technical problems associated with communicating an indication of a traffic indication map for a large number of devices. For instance, some embodiments may be designed to address one or more technical problems such as compressing a partial virtual bitmap of the traffic indication map.

Different technical problems such as those discussed above may be addressed by one or more different embodiments. For instance, some embodiments that compress a partial virtual bitmap of the traffic indication map may do so by one or more different technical means such as inclusion of a field value in TIM element indicating the number of contiguous blocks that have the same block encoding and eliminating the repetitive block offset and block control field values for these contiguous blocks.

Some embodiments implement Institute of Electrical and Electronic Engineers (IEEE) 802.11 systems such as IEEE 802.11ah systems and other systems that operate in accordance with standards such as the IEEE 802.11-2012, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/get-ieee802/download/802.11-2012.pdf).

According to one embodiment, the partial virtual bitmap based upon the hierarchical data structure for traffic indication mapping is defined to enable a greater number of associated stations and to utilize a more efficient TIM element and, in many instances, smaller TIM element for low-power consumption stations such as small battery-powered wireless devices (e.g., sensors) to use Wi-Fi to connect to the Internet with very low power consumption. Supporting such a large number of stations becomes challenging especially when those associated stations are in a power save (PS) mode because a much larger TIM element may have to be transmitted to describe, in a partial virtual bitmap, all stations between the block with the lowest station AID for which data is buffered to the block with the highest station AID. Furthermore, IEEE 802.11ah compliant devices have a physical layer (PHY) data rate significantly lower than IEEE 802.11n PHY data rates so the overhead of TIM element transmission becomes much larger in terms of channel occupancy.

Several embodiments comprise access points (APs) for and/or client devices of APs or other stations (STAs) such as routers, switches, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and sensor services. For example, some embodiments may provide a metering station to collect data from sensors that meter the usage of electricity, water, gas, and/or other utilities for a home or homes within a particular area and wirelessly transmit the usage of these services to a meter substation. Further embodiments may collect data from sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services may generally require much lower data rates and much lower (ultra low) power consumption than devices provided in IEEE 802.11n/ac systems.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise an access point (AP). The communications device 1030 may comprise a low power communications device such as a sensor, a consumer electronics device, a personal mobile device, or the like. And communications devices 1050 and 1055 may comprise sensors, stations, access points, hubs, switches, routers, computers, laptops, netbooks, cellular phones, smart phones, PDAs (Personal Digital Assistants), or other wireless-capable devices. Thus, communications devices may be mobile or fixed. For example, the communications device 1010 may comprise a metering substation for water consumption within a neighborhood of homes. Each of the homes within the neighborhood may comprise a sensor such as the communications device 1030 and the communications device 1030 may be integrated with or coupled to a water usage meter.

Initially, the communications device 1030 may associate with the communications device 1010 and receive an association identifier (AID) from the communications device 1010 to uniquely identify the communications device 1030 with respect to other communications devices associated with the communications device 1010 such as devices 1050 and 1055. In many embodiments, the AID may comprise 13 bits, wherein the bits identify the page, block, sub-block, and a bit position for the station within the sub-block. FIG. 1B depicts an embodiment of such an AID structure 1150. Thereafter, the communications device 1010 may buffer data such as medium access control (MAC) service data units (MSDUs) for the communications device 1030.

After buffering an MSDU for the communications device 1030, the communications device 1010 may transmit a beacon to associated devices, identifying the devices with data buffered by the communications device 1010 by means of a traffic indication map (TIM) element such as the frame 1014. In the present embodiment, the TIM element may identify the AID of each station that has data buffered such as the communications device 1030 by identifying the TIM segment number, the page, the block, and, depending upon the encoding of the block, the sub-block of the stations. The communications device 1010 may generate a partial virtual bitmap field comprising block fields such as a block control field, a block offset field, a number of blocks field, a block bitmap field, and, in some instances, a one or more sub-block fields.

In the present embodiment, the communications device 1010 may generate a value for the block control field indicative of a block encoding scheme such as a block bitmap mode, a single AID mode, an Offset+Length+Bitmap (OLB) mode, or an inverse mode. The communications device 1010 may generate a value for the block offset field indicative of an offset of a block within a page that is associated with the partial virtual bitmap. The communications device 1010 may generate a value for the block control field indicative of block encoding scheme used to encode the block and possibly additional contiguous blocks. The communications device 1010 may generate a value for the number of blocks field indicative of a number of contiguous blocks from the traffic indication map represented by subsequent block bitmaps that are included in the partial virtual bitmap block that have been encoded with the same block encoding scheme, i.e., the encoding indicated by block control field value. The communications device 1010 may generate values for one or more block bitmap fields indicative of one or more blocks encoded by the encoding scheme indicated by the block control field value. And the communications device 1010 may generate values for one or more sub-block fields indicative of the value in the traffic indication map corresponding to the each STA's AID in the corresponding sub-block.

The sub-block field values are representative of a sub-block bitmap that identifies the stations in the sub-block of the traffic indication map that have buffered data at the communications device 1010. In many embodiments, a logical one at the bit location in the sub-block associated with the communications device 1030 may indicate that the communications device 1010 is buffering data for the communications device 1030. In further embodiments, a logical zero may represent that the communications device 1010 is buffering data for the communications device 1030.

The communications device 1030 may interpret the TIM element based upon the AID assigned to the communications device 1030 by the communications device 1010. In many embodiments, the communications device 1030 may parse the AID to determine a page associated with communications device 1030 and may parse the TIM element to determine if the TIM element describes data buffering for stations associated with the same page. If so, the communications device 1030 may parse the TIM element to determine if the TIM element describes data buffering for stations if the block index from the AID falls within the range of blocks identified by a TIM segment number. If so, the communications device 1030 may repeat the process of parsing the association identifier and comparing the values of the block and sub-block with those represented by the TIM element to determine whether the TIM element indicates that the communications device 1010 is buffering data for the communications device 1030 and/or whether the TIM element includes data at the bit position in the sub-block associated with the communications device 1030 that indicates that the communications device 1010 is buffering data for the communications device 1030. For instance, MAC logic of the communications device 1030 such as MAC sublayer logic 1038 may parse the block offset field, the block control field, and the number of blocks field to determine that the partial virtual bitmap of the TIM element comprises a number of contiguous blocks that are associated with the same block encoding. Thus, the communications device 1030 may locate the block bitmap corresponding to the block with which the communications device's 1030 AID falls to determine whether the communications device 1010 is buffering data for the communications device 1030 without having to repeatedly parse the same block offset field values.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise memory 1011 and 1031, medium access control (MAC) sublayer logic 1018 and 1038, and physical layer (PHY) logic 1019 and 1039, respectively. The memory 1011 and 1031 may comprise a storage medium such as dynamic random access memory (DRAM), read only memory (ROM), buffers, registers, cache, flash memory, hard disk drives, solid-state drives, or the like. The memory 1011 and 1031 may store frames and/or frame structures, or portions thereof such as a management frame structure and a traffic indication map (TIM) element based upon a hierarchical data structure such as the hierarchical data structure 1100 illustrated in FIG. 1A. More specifically, the memory 1011 and 1031 may comprise a TIM element with a partial virtual bitmap that comprises a number of blocks field to identify a number of contiguous blocks that are encoded with the same encoding scheme. Furthermore, the memory 1011 may comprise a traffic indication map in a hierarchical data structure that identifies the associated stations for which data is buffered. For example, the memory 1011 may comprise an indication that the communications device 1010 comprises buffered data as well as a reference or link to the buffered data for the communications device 1030.

The MAC sublayer logic 1018, 1038 may comprise logic to implement functionality of the MAC sublayer of the data link layer of the communications device 1010, 1030. The MAC sublayer logic 1018, 1038 may generate the frames such as management frames and the physical layer logic 1019, 1039 may generate physical layer protocol data units (PPDUs) based upon the frames. For example, the frame builder 1013 may generate frames with a TIM element 1014 and the data unit builder of the physical layer logic 1019 may encapsulate the frames with preambles to generate PPDUs for transmission via a physical layer device such as the transceivers (RX/TX) 1020 and 1040.

Figure 1C:
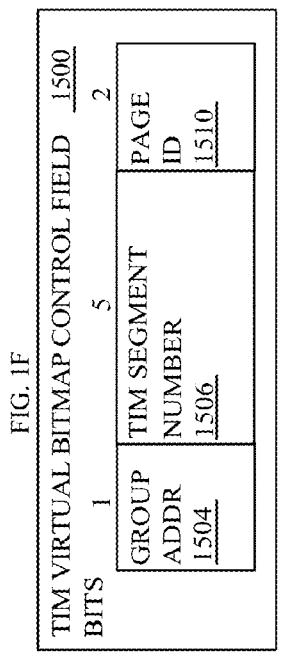
FIG. 1C depicts an embodiment of a management frame with a traffic indication map element for communicating content of a contiguous number of blocks of a traffic indication map.

The frame with the TIM element 1014 may comprise a frame such as the management frame 1200 in FIG. 1C. In particular, the frame with the TIM element 1014 may comprise a partial virtual bitmap based upon a hierarchical data structure such as the partial virtual bitmap 1700 illustrated in FIG. 1E and may identify each station within, e.g., one page, that has data buffered by an AP such as communications device 1010. For example, the AP may not arbitrarily transmit MSDUs to stations operating in a power saving (PS) mode, but may buffer the MSDUs and only transmit the MSDUs at designated times. Furthermore, the stations that currently have buffered MSDUs within the AP may be identified in frame comprising a TIM element, which may be included, e.g., as an element within beacon frames generated by the AP.

Then, each station may determine that an MSDU is buffered for the station (such as communications device 1030) by receiving and interpreting the TIM element in the beacon frame. In a base service set (BSS) operating under a distributed coordination function (DCF), upon determining that an MSDU is currently buffered in the AP, a station operating in the PS mode may transmit a PS-Poll frame to the AP, which may respond with the corresponding buffered MSDU immediately, or acknowledge the PS-Poll and respond with the corresponding MSDU at a later time.

The communications devices 1010, 1030, 1050, and 1055 may each comprise a transceiver such as transceivers 1020 and 1040. Each transceiver 1020, 1040 comprises an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

In some embodiments, the communications device 1010 optionally comprises a Digital Beam Former (DBF) 1022, as indicated by the dashed lines. The DBF 1022 transforms information signals into signals to be applied to elements of an antenna array 1024. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a DBF 1042.

FIG. 1A depicts an embodiment of a hierarchical data structure 1100 for traffic indication mapping. On the top level of the hierarchy, the traffic indication virtual map may be divided into four pages in the present embodiment. Each page, in the present embodiments, may support up to 2048 stations and, in several embodiments, each page may be transmitted as a separate TIM element. In some embodiments, multiple TIM elements may be transmitted in the same medium access control (MAC) service data unit (MSDU). In further embodiments, multiple MSDUs may be aggregated in each physical layer (PHY) protocol data units (PPDUs). In other embodiments, the hierarchical data structure 1100 may comprise more or less than four pages.

Each page may comprise up to 32 blocks and each of the 32 blocks may support up to 64 of the stations. Each block may comprise eight sub-blocks. Each sub-block may be one octet in length and may support eight of the stations associated with the corresponding block. In further embodiments, each block may comprise more or less than eight sub-blocks and each of the sub-blocks may be more or less than one octet in length. In some embodiments, for instance, increasing the number of pages inversely affects the number of blocks and vice versa. For example, increasing to 8 pages may reduce the number of blocks per page to 16 and increasing the pages to 16 decreases the number of blocks per page to 8 blocks.

Each bit of a sub-block may correspond to a different association identifier (AID) and thus, each bit may uniquely identify a station. In the present embodiment, the bit may be set to 1 if there is data buffered at the AP. Otherwise, the bit may be cleared to 0.

FIG. 1B depicts an embodiment of an association identifier structure 1150 for the hierarchical data structure illustrated in FIG. 1A. In the present embodiment, the AID comprises 13 bits. In other embodiments, the AID structure 1150 may comprise more or less than 13 bits.

In the present embodiment, the AID structure 1150 may comprise a page identifier (ID) having two bits (b12-b11), which is represented as "a" in the AID equation depicted below the AID structure 1150. The AID structure 1150 may comprise a page ID/block index extension having two bits (b10-b9), which is represented as "b" in the AID equation. The page ID/block index extension may facilitate a greater ratio of pages per block or blocks per page. The AID structure 1150 may comprise a block index having three bits (b8-b6), which is represented as "c" in the AID equation. The AID structure 1150 may comprise a sub-block index having three bits (b5-b3), which is represented as "d" in the AID equation. And, the AID structure 1150 may comprise a station bit position index having three bits (b2-b0), which is represented as "e" in the AID equation.

The AID equation may describe the calculation of a unique number per station based upon the hierarchical data structure illustrated in FIG. 1A. In particular, the AID unique number in some embodiments may be calculated by the following formula:

$$AID=((((\text{Page ID} \times 4 + (\text{Page ID/Block index extension}-1)) \times 8 + (\text{Block index}-1)) \times 8 + (\text{Sub-block index}-1)) \times 8 + (\text{station bit position index})$$

To illustrate, if the variables are: the Page ID=0, the page ID/block index=1, the block index=2, the sub-block index=6. As a result, the equation becomes:

$$AID=((((0 \times 4 + (1-1)) \times 8 + (2-1)) \times 8 + (6-1)) \times 8 + (4) = 108$$

Many embodiments split the traffic indication map into TIM segments. The TIM segments may comprise page segments split across a delivery traffic indication map (DTIM) period. Each DTIM period or beacon interval may comprise one page of the traffic indication map. Thus, the length of a page segment may comprise the number of blocks in one page divided by the number of TIM segments in a DTIM beacon interval. The Page offset and Page segment count fields in the segment count information element indicate initial block offset and range of TIM element in each TIM segment. Note that the segment count information element may be sent in the DTIM beacon frames to indicate the assignment of STAs to TIM segments. In many embodiments, the segment count information is not included in the TIM elements.

In many embodiments, the partial virtual bitmap may include a number of contiguous blocks that can be encoded with the same encoding scheme. In such embodiments, the AID for a block within the partial virtual bitmap may be determined by:

AID=[Page Index(2b),Block Offset(5b)+i,n(4b),m(2b)],where i=[0:n−1]

wherein the n-th bit position of the block bitmap indicates whether the n-th sub-block bitmap is present in the sub-block field. And the m-th bit position of the sub-block bitmap indicates whether the m-th STA has data buffered at the AP.

The Block Offset and Range may be determined as:

Block offset/start=page offset+((length of page segment)*(TIM segment number−1))+1

Block Range=page offset+length of page segment*TIM segment number

FIG. 1I depicts an embodiment of a hierarchical data structure 1900 for a bitmap control field and a partial virtual bitmap for a traffic indication map element for the case where n contiguous blocks are encoded. In many embodiments, if the partial virtual bitmap field contains n contiguous blocks that are using the block bitmap encoding mode: (1) Only the first block contains the block control and the block offset fields. (2) The encoded blocks that follow the first encoded block do not contain the block control and the block offset fields, reducing overhead by one octet for every encoded block. (3) The number of blocks field indicates the number of encoded blocks. (4) In many embodiments, the size of the block bitmap field may be increased to 2 octets and the size of the sub-block field may be 4 bits long.

The bitmap control field may describe the content of the partial virtual bitmap. The partial virtual bitmap may describe the portion of the traffic indication map indicated in the bitmap control field and may provide indications for stations associated with the bitmap regarding whether or not data is being buffered for the station at the access point that transmitted the beacon with the traffic indication map.

FIG. 1C depicts an embodiment of a management frame 1200 for communications between wireless communication devices such as communications devices 1010, 1030, 1050, and 1055 in FIG. 1. The management frame 1200 may comprise a MAC header 1201, a frame body 1214, and a frame check sequence (FCS) field 1226. The MAC header 1201 may comprise the frame control field 1202 and other MAC header fields 1208. The frame control field 1202 may be two octets and may identify the type and subtype of the frame such as a management type and, e.g., a beacon frame subtype. The other MAC header fields 1208 may comprise, for example, one or more address fields, identification fields, control fields, or the like.

In some embodiments, the management frame 1200 may comprise a frame body 1214. The frame body 1214 may be a variable number of octets and may include data elements, control elements, or parameters and capabilities. In the present embodiment, the frame body 1214 comprises a traffic indication map (TIM) element 1220.

Figure 1D:
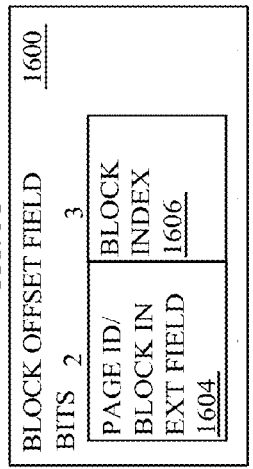
FIG. 1D depicts an embodiment of a traffic indication map element for establishing communications between wireless communication devices.

FIG. 1D illustrates an embodiment of a TIM element 1300. An access point (AP) may transmit the TIM element 1300 to inform stations such as low power sensors that the AP is buffering data for the station. In many embodiments, the station may then initiate communications with the AP to obtain the buffered data such as via a poll frame. In other embodiments, the AP may transmit the data to the station after transmitting the beacon.

The TIM element 1300 may comprise fields such as an element identifier (ID) field 1302, a length field 1306, a delivery TIM (DTIM) count field 1308, a DTIM period field 1310, a TIM virtual bitmap control field 1312, and partial virtual bitmap 1314. The element ID field 1302 may be one octet and may identify the element as a TIM element 1300. The length field 1306 may be one octet and may define the length of the TIM element 1300 or the length of a portion thereof. The DTIM count 1308 may be one octet and may indicate how many beacon frames (including the current frame) appear before the next DTIM frame (the next DTIM beacon interval). A DTIM Count field 1308 value of 0 may indicate that the current TIM frame is a DTIM frame. For instance, immediately after every DTIM (beacon frame with DTIM Count field 1308 of the TIM element 1300 equal to zero), the AP shall transmit all buffered, group-addressed frames. If the TIM indicating the buffered MSDU or aggregate MSDU (A-MSDU) is sent during a contention-free period (CFP), a contention-free (CF)-Pollable station operating in the power-savings (PS) mode does not send a power-saving (PS)-Poll frame, but remains active until the buffered MSDU or A-MSDU is received (or the CFP ends). If any station in its base service set (BSS) is in PS mode, the AP may buffer all group-addressed MSDUs and deliver them to all stations immediately following the next beacon frame containing a DTIM transmission.

The DTIM period field 1310 may be one octet and may indicate the number of beacon intervals between successive DTIMs. In many embodiments, if all TIM frames are DTIMs, the DTIM period field 1310 may have the value 1.

The TIM virtual bitmap control field 1312 may be one or two octets and may describe the content of the partial virtual bitmap 1314. For instance, the TIM virtual bitmap may include a bit such as bit 0 that contains a traffic indicator bit associated with Group Addressed Buffered Data 0 such as Group Addressed Buffered Data 1504 illustrated in FIG. 1F. This bit may be set to 1 in TIM elements 1300 with a value of 0 in the DTIM Count field 1308 when one or more group-addressed frames are buffered at the AP.

Figure 1F:
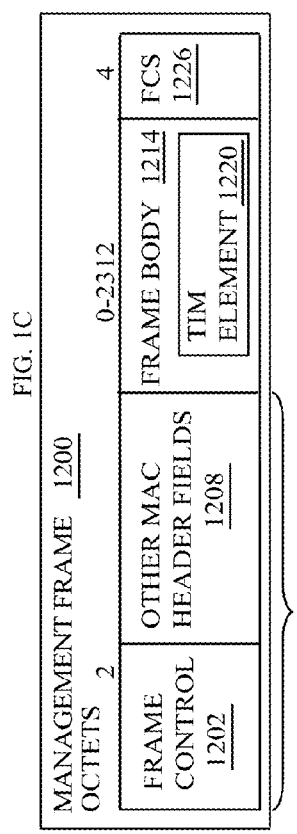
FIG. 1F depicts an embodiment of a traffic indication map, virtual bitmap control field such as the traffic indication map, virtual bitmap control field illustrated in FIG. 1D.

An embodiment of a TIM virtual partial bitmap control field 1500 is depicted in FIG. 1F. The TIM virtual partial bitmap control field 1500 may comprise the Group Addressed Buffered Data field 1504, a TIM segment field 1506, and a page identifier (ID) field 1510. The TIM segment field 1506 may be 5 bits and may indicate the TIM segment number of the TIM segment included in the TIM element at which the partial virtual bitmap begins.

The page ID field 1504 may be 2 bits in length and may indicate the page index of 0 through 3 (binary bits 00, 01, 10, and 11, respectively) to represent four pages. In some embodiments, the number of pages may be extended via the page ID/block index extension field 1604 to describe, e.g., eight or 16 pages rather than four pages.

Figure 1E:
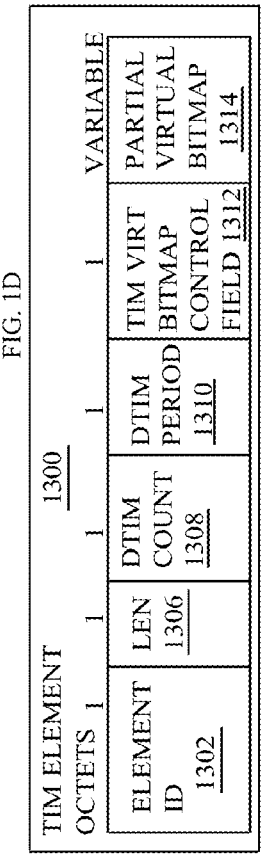
FIG. 1E depicts an embodiment of partial virtual bitmap based upon a hierarchical data structure for traffic indication mapping such as the hierarchical data structure illustrated in FIG. 1A.

Referring again to FIG. 1D, the partial virtual bitmap field 1314 may comprise bits describing stations for which data is buffered by the AP based upon a hierarchical data structure such as the hierarchical data structure illustrated in FIG. 1A. FIG. 1E depicts an embodiment of a partial virtual bitmap field 1700. The partial virtual bitmap 1700 may comprise multiple blocks 1720 such as block 1701. The block 1701 may comprise a block control field 1702, a block offset field 1704, a number of blocks field 1706, a block bitmap field 1708, and may also include a variable number of sub-blocks from sub-block 1 1710 to sub-block N 1712.

Figure 1G:
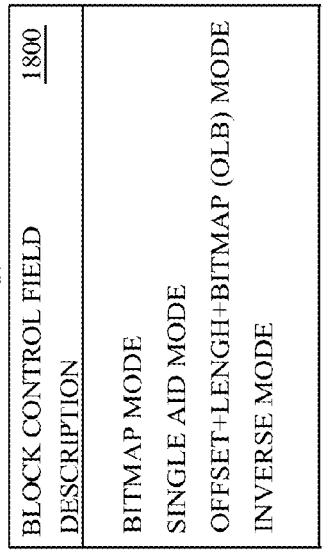
FIG. 1G depicts an embodiment of a block offset field such as the block offset field illustrated in FIG. 1E.

The block offset field 1704 may describe an offset for the block 1701 within the blocks 1720 in the partial virtual bitmap 1700. In the present embodiment, the block offset field 1702 locates the position of the Block 1701 in a page that is indicated in the page ID field 1510 in the TIM virtual bitmap control field 1500 in FIG. 1F. The block offset field 1704 may comprise a page ID/block index extension field 1604 and a block index field 1606 such as the block offset field 1600 illustrated in FIG. 1G according to one embodiment.

The number of blocks field 1706 may comprise, e.g., one octet, and may describe a number of contiguous blocks to be described after the block offset field 1704. In other words, the block control field 1702 and the block offset field 1704 do not need to be repeated if the blocks are contiguous and encoded in accordance with the same encoding scheme. The indication of the block offset and the number of blocks is sufficient to describe the content of the partial virtual mapping of the contiguous blocks. On the other hand, in many embodiments, the number of blocks may be one if there is one block and there is no contiguous block, increasing the allocation for the block bitmap by, e.g., one octet.

Figure 1H:
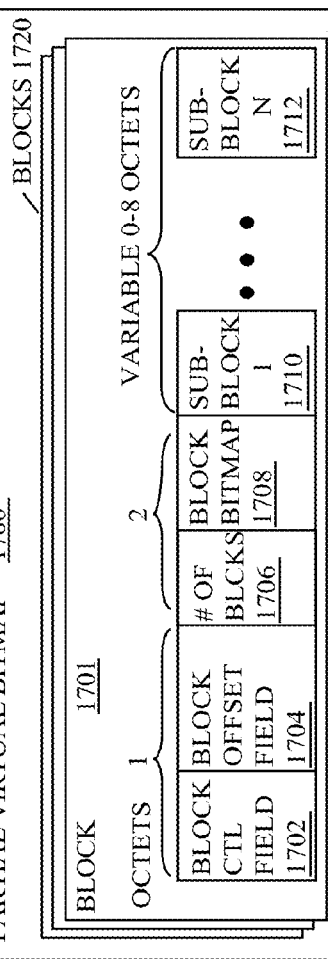
FIG. 1H depicts an embodiment of block control field descriptions for encoding schemes.
Figure 11:
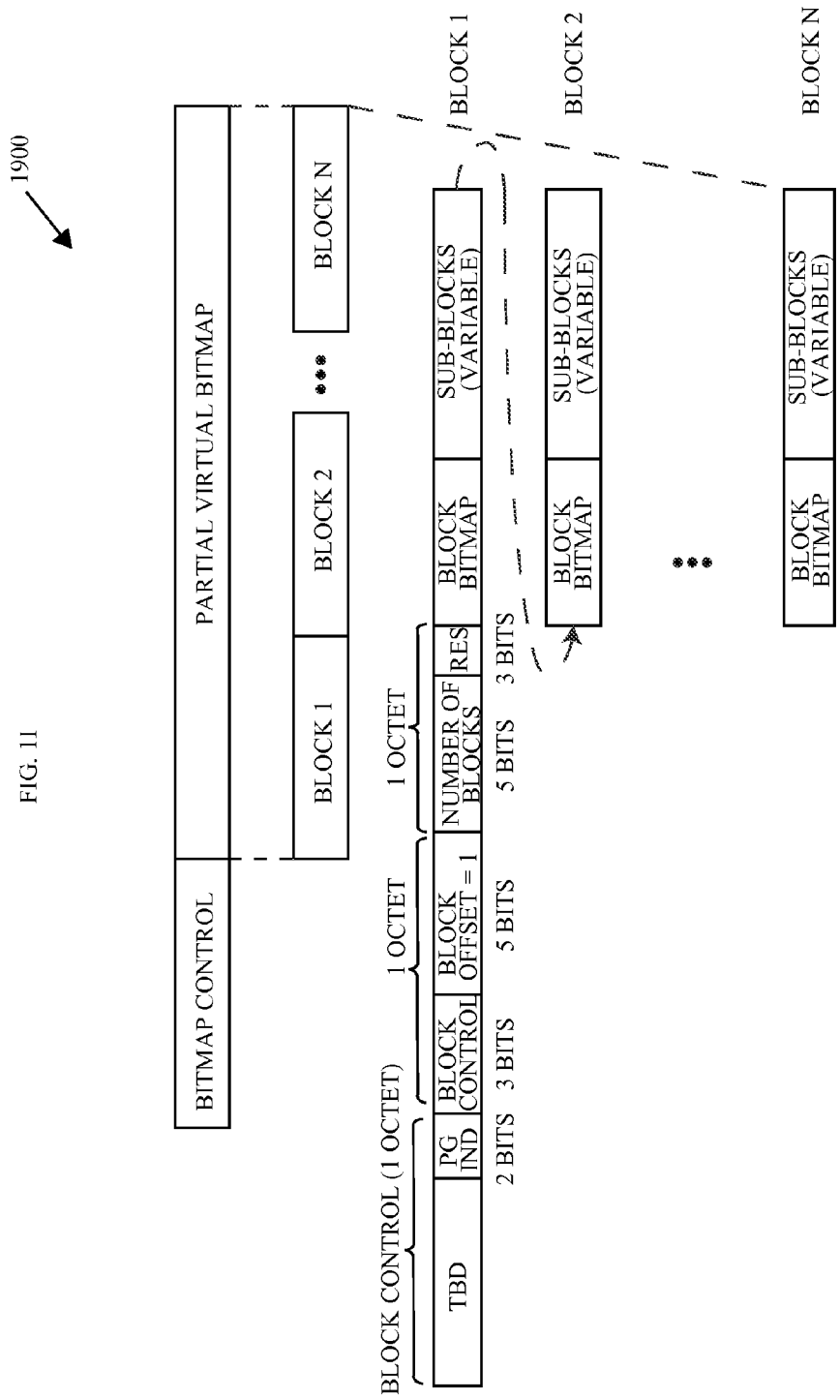

The block control field 1702 may control the encoding of the following block bitmap field 1708 and the sub-block bitmap fields, sub-block bitmap field 1 1710 through sub-block bitmap field N 1712. In some embodiments, the encodings may comprise one or more of the encodings described in the block control field table 1800 of FIG. 1H. Table 1800 may include block bitmap mode encoding, single AID encoding, offset+length+bitmap (OLB) mode encoding, and inverse mode encoding. The block bitmap mode encoding may include a block bitmap with a bit set for each sub-block included with the block bitmap followed by the sub-blocks, which have a bit set for each station that has data buffered at the AP. The single AID mode may encode the situation in which there is a single AID in a block associated with the block bitmap. In such embodiments, 6 bits of the block bitmap field 1708 are used to indicate the AID and no sub-block field is not present (total 2 octets). In the single AID encoding, the AID=[Page Index(2 bits), Block Offset(5 bits), Block Bitmap[6 bits of the 8 bits that contain the AID]].

The inverse bitmap mode may inverse a bitmap and encode the inversed bitmap if there are more logical ones in the bitmap of the block than there are logical zeros. And the OLB encoding scheme encodes more than 8 contiguous sub-block bitmaps. In the OLB encoding scheme, the block bitmap field 1708 may be used to indicate the length of sub-block bitmaps following the block bitmap field 1708.

In the present embodiment, the block bitmap field 1708 may indicate which sub-blocks (1 through N) are present in the following sub-block fields 1710 through 1712. The m-th bit in the sub-block bitmap field 1708 indicates the m-th sub-block. If the m-th bit is set to 1, the m-th sub-block is present in the following sub-block fields 1710 through 1712. If the m-th bit is set to 0, the m-th sub-block is not present in the following sub-block fields 1710 through 1712.

The sub-block fields 1710 through 1712, if present, may be variable in length (1 to 8 octets) depending on the value of the block control field 1704. Each bit corresponds to an AID of a station. If the p-th bit of a sub-block bitmap field 1710 is set to 1, it indicates that there is data buffered for the corresponding station. Using the hierarchy shown in FIG. 1A, the Sub-block1 bitmap [b0 . . . b7] is encoded as "00000010" by setting the 6-th bit to 1, indicating that there is data buffered at the AP for the station with AID equal to 6.

Referring again to FIG. 1C, in many embodiments, the management frame 1200 may comprise a frame check sequence (FCS) field 1226. The FCS field 1226 may be four octets and may include extra checksum characters added to the short frame 1060 for error detection and correction.

Note that the values shown in the FIGS. 1A-1H are for illustrative purposes and may be other values in other embodiments.

Figure 1J:
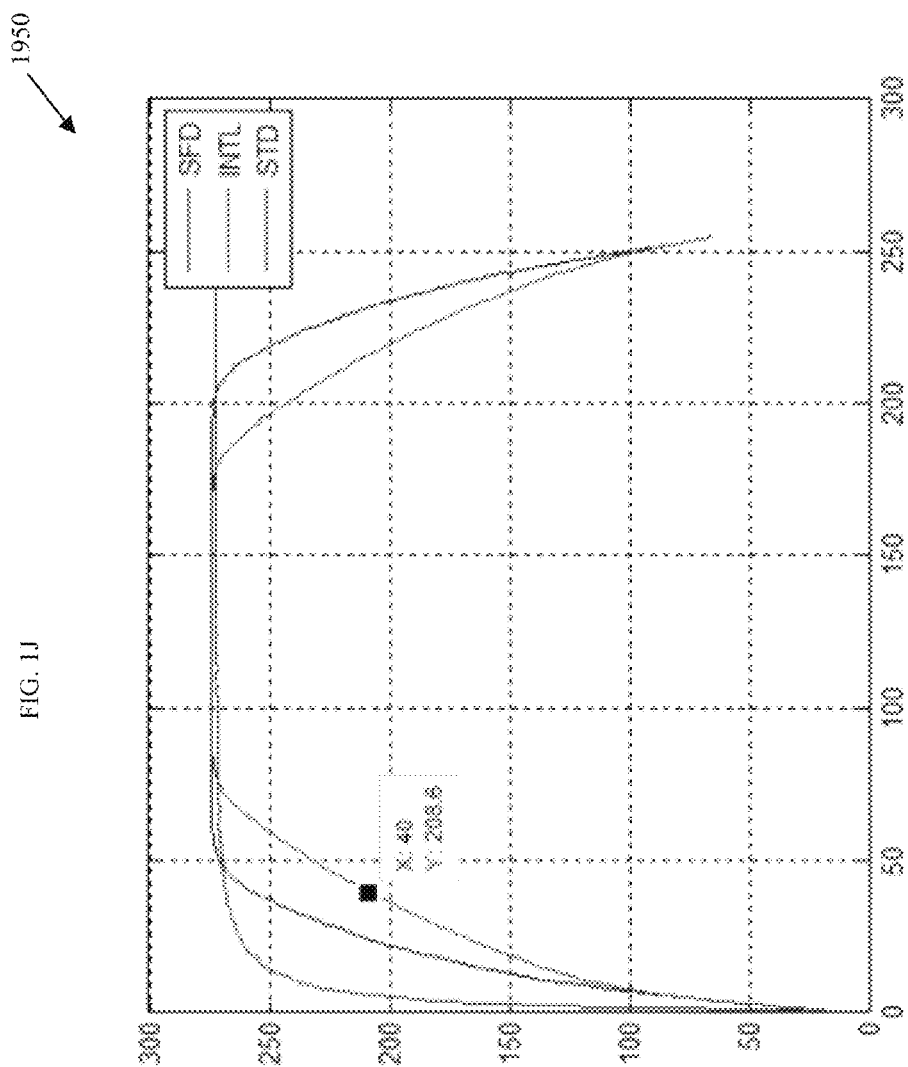
FIG. 1J depicts a simulation of an embodiment of the proposed TIM encoding scheme compared with the scheme in the 802.11ah Spec Framework document ["*Proposed Specification Framework for TGah,*" IEEE 802.11-11/1137r10] (denoted as SFD) and the TIM encoding scheme defined in IEEE 802.11-2012 standard (denoted as STD in the graph)

FIG. 1J depicts a simulation 1950 of an embodiment of the proposed traffic indication map (TIM) encoding scheme compared with the scheme in the IEEE 802.11 ah Spec Framework document ["Proposed Specification Framework for TGah," Institute of Electrical and Electronic Engineers, IEEE 802.11-11/1137r10, IEEE P802.11 Wireless LANs, Jul. 18, 2012, (http://www.ieee802.org/11/Reports/tgah_update.htm)] (denoted as SFD) and the TIM encoding scheme defined in IEEE 802.11-2012 standard (denoted as STD in the graph). Assuming that 256 stations (STAs) are associated with an access point (AP) and by increasing the number of paged STAs from 1 to 256 STAs (x-axis), the encoded TIM bitmap size (y-axis) shows that the proposed scheme improves the TIM encoding compared to the scheme proposed in IEEE 802.11-11/1137r10.

Figure 2:
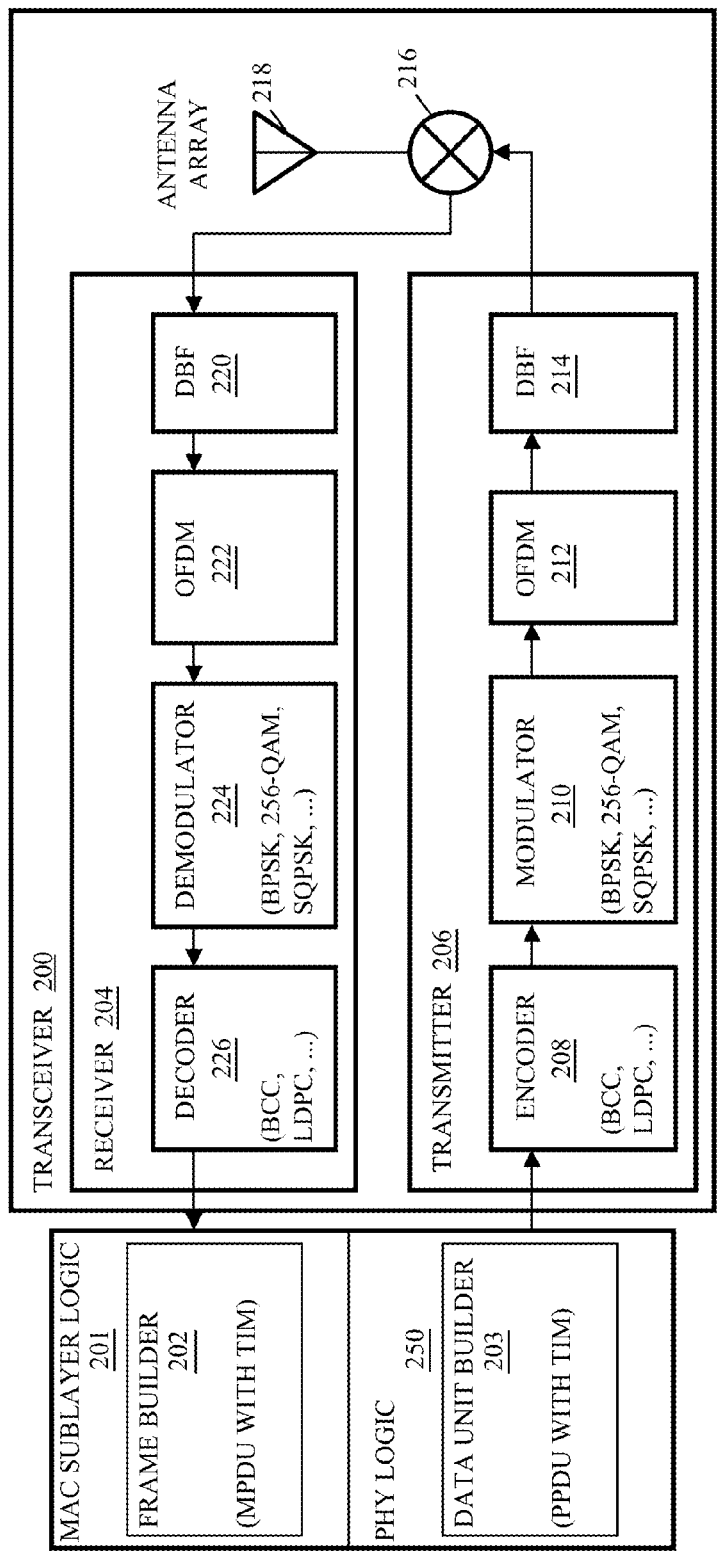
FIG. 2 depicts an embodiment of an apparatus to generate, transmit, receive and interpret a frame with a partial virtual bitmap based upon a hierarchical data structure for traffic indication mapping.

FIG. 2 depicts an embodiment of an apparatus to generate, transmit, receive, and interpret or decode a traffic indication map (TIM) element in a frame. The apparatus comprises a transceiver 200 coupled with Medium Access Control (MAC) sublayer logic 201 and a physical layer (PHY) logic 250. The MAC sublayer logic 201 may determine a frame and the physical layer (PHY) logic 250 may determine the PPDU by encapsulating the frame or multiple frames, MAC protocol data units (MPDUs), with a preamble to transmit via transceiver 200.

In many embodiments, the MAC sublayer logic 201 may comprise a frame builder 202 to generate frames such as one of the management frame 1200 with TIM elements 1220 or 1300 illustrated in FIGS. 1A-H. The TIM elements may comprise data indicative of MAC service data units (MSDUs) buffered or stored by an associated access point (AP) for particular stations associated with the AP. Association identifiers (AIDs) may identify the stations. The AP such as the communications device 1010 and a station such as the communications device 1030 in FIG. 1 may maintain some or part of the TIM elements 1220 or 1300 and values in memory such as the memory 1012 and 1032 illustrated in FIG. 1.

The PHY logic 250 may comprise a data unit builder 203. The data unit builder 203 may determine a preamble to encapsulate the MPDU or more than one MPDUs to generate a PPDU. In many embodiments, the data unit builder 203 may create the preamble based upon communications parameters chosen through interaction with a destination communications device.

The transceiver 200 comprises a receiver 204 and a transmitter 206. The transmitter 206 may comprise one or more of an encoder 208, a modulator 210, an OFDM 212, and a DBF 214. The encoder 208 of transmitter 206 receives and encodes data destined for transmission from the MAC sublayer logic 202 with, e.g., a binary convolutional coding (BCC), a low density parity check coding (LDPC), and/or the like. The modulator 210 may receive data from encoder 208 and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid. The output of modulator 210 is fed to an orthogonal frequency division multiplexer (OFDM) 212, which impresses the modulated data from modulator 210 onto a plurality of orthogonal sub-carriers. And, the output of the OFDM 212 may be fed to the digital beam former (DBF) 214 to form a plurality of spatial channels and steer each spatial channel independently to maximize the signal power transmitted to and received from each of a plurality of user terminals.

The transceiver 200 may also comprise duplexers 216 connected to antenna array 218. Thus, in this embodiment, a single antenna array is used for both transmission and reception. When transmitting, the signal passes through duplexers 216 and drives the antenna with the up-converted information-bearing signal. During transmission, the duplexers 216 prevent the signals to be transmitted from entering receiver 204. When receiving, information bearing signals received by the antenna array pass through duplexers 216 to deliver the signal from the antenna array to receiver 204. The duplexers 216 then prevent the received signals from entering transmitter 206. Thus, duplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal.

The transceiver 200 may comprise a receiver 204 for receiving, demodulating, and decoding information bearing signals. The receiver 204 may comprise one or more of a DBF 220, an OFDM 222, a demodulator 224 and a decoder 226. The received signals are fed from antenna elements 218 to a Digital Beam Former (DBF) 220. The DBF 220 transforms N antenna signals into L information signals. The output of the DBF 220 is fed to the OFDM 222. The OFDM 222 extracts signal information from the plurality of subcarriers onto which information-bearing signals are modulated. The demodulator 224 demodulates the received signal, extracting information content from the received signal to produce an un-demodulated information signal. And, the decoder 226 decodes the received data from the demodulator 224 and transmits the decoded information, the MPDU or more than one MPDUs, to the MAC sublayer logic 201.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing.

The MAC sublayer logic 201 may decode or parse the MPDU or MPDUs to determine the particular type of frame or frames and identify one or more TIM elements included in the MPDU(s). For each TIM element, the MAC sublayer logic 201 may parse the TIM element to determine the TIM segment number from the TIM element.

In other embodiments, if an inverse encoding for a block is set in the TIM element, the sub-blocks may refer to sub-blocks that do not have data buffered, or the bits associated with the AID of the receiving station may comprise a logical zero to indicate that data is buffered for the receiving station at the AP and a logical one to indicate that data is not buffered at the AP.

Figure 3:
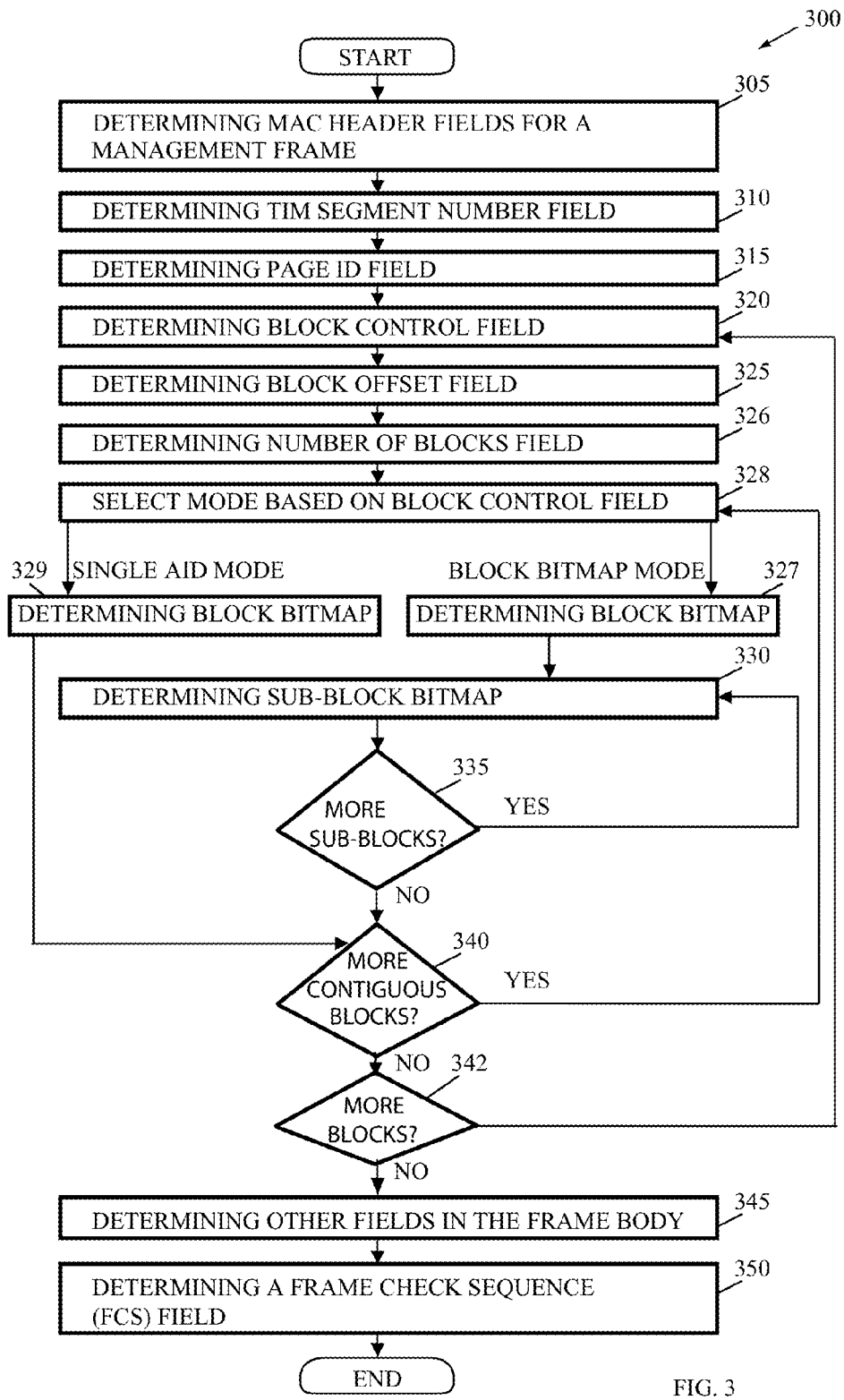
FIG. 3 depicts an embodiment of a flowchart to generate a frame with a partial virtual bitmap based upon a hierarchical data structure for traffic indication mapping.

FIG. 3 depicts an embodiment of a flowchart 300 to generate or otherwise determine a management frame with a TIM element such as the TIM elements described in conjunction with FIGS. 1-2. The flowchart 300 begins with a medium access control (MAC) sublayer logic determining a MAC header for a management frame (element 305). The MAC sublayer logic may thereafter determine the TIM element for the frame body. The MAC sublayer logic may determine a TIM segment number field (element 310). The TIM segment number may be the sequence number of the TIM associated with the range of blocks from a page included in the TIM element.

Determining the TIM element may further comprise determining a page identifier field to identify the page of association identifiers (AIDs) for which the TIM element comprises information about data buffered for stations (element 310). For instance, the MAC sublayer logic may access memory to retrieve an element structure for the TIM elements and assign the elements values such as a logical one to indicate that devices have data buffered at the access point (AP) within which the MAC sublayer logic resides.

The MAC sublayer logic may determine a block control field (element 320) of a block in the partial virtual bitmap. The block control field may be present for each of the blocks to indicate an encoding scheme for the block. The MAC sublayer logic may determine a block offset field (element 325) and the flowchart 300 continues to determine whether additional blocks are available to encode after encoding the number of blocks field (element 326). If more than one contiguous blocks are to be encoded with the same encoding scheme, the number of blocks field value indicates the number of contiguous blocks and more than one block bitmap fields representing the contiguous blocks follow and should be encoded in accordance with the same encoding scheme.

The present embodiment illustrates the block bitmap mode and the single AID mode for encoding. If the block control field value indicates a single AID encoding scheme, the MAC sublayer logic may determine the block bitmap (element 329). The MAC sublayer logic skips the determining of content of the sub-block bitmaps because the single AID mode does not include sub-blocks but determines the AID of the single station with buffered data and includes the AID in 6 bits of the 8 bits in the block bitmap field. The MAC sublayer logic determines whether there are additional contiguous blocks (element 340) and, if so, the flowchart 300 continues with determining the next block bitmap (elements 328 and 329). In some embodiments, the number of contiguous blocks field may not be used for the single AID encoding and decoding schemes. Otherwise, the MAC sublayer logic determines whether there are additional blocks (element 342) and, if so, the flowchart 300 continues with determining the value in block control field (element 320) of the next block.

If the block control field value indicates a block bitmap encoding scheme, the MAC sublayer logic may determine the block bitmap (element 327) in accordance with a block bitmap decoding scheme. The MAC sublayer logic continues by determining the content of the sub-block bitmaps until there are no additional sub-blocks (element 335). In the present, the MAC sublayer logic determines whether there are additional contiguous blocks to encode (element 340) and, if so, the flowchart 300 continues with determining the next block bitmap (elements 328 and 327). If there are no more contiguous blocks to represent in the block bitmaps, the MAC sublayer logic determines whether there are additional blocks after the contiguous number of blocks (element 342) with in the TIM segment to include in the TIM element and, if so, the flowchart 300 continues with determining the value in block control field (element 320) of the next block in the TIM segment.

Otherwise, the MAC sublayer logic may determine other elements of the management frame body frame (element 345). In many embodiments, determining the fields may comprise retrieving these fields from a storage medium for inclusion in a frame. In other embodiments, the values to include in such fields may be stored in a storage medium such as a read only memory, random access memory, a cache, a buffer, a register, or the like. In further embodiments, one or more of the fields may be hardcoded into the MAC sublayer logic, PHY logic, or may otherwise be available for insertion into a frame. In still other embodiments, the MAC sublayer logic may generate the values of the fields based upon access to indications of the values for each.

After determining the other portions of the frame, the MAC sublayer logic may determine a frame check sequence (FCS) field value (element 350) to provide for error corrections in bit sequences received by the receiving device.

FIGS. 4A-B depict embodiments of flowcharts 400 and 450 to transmit, receive, and interpret or decode communications with a management frame with a TIM element such as the TIM elements illustrated in FIGS. 1A-H. Referring to FIG. 4A, the flowchart 400 may begin with receiving a frame from the frame builder comprising one or more TIM elements. The MAC sublayer logic of the communications device may generate the frame as a management frame to transmit to a station and may pass the frame as an MPDU to a data unit builder that transforms the data into a packet that can be transmitted to a station. The data unit builder may generate a preamble to encapsulate one or more of the MPDUs from the frame builder to form a PPDU for transmission (element 405).

The PPDU may then be transmitted to the physical layer device such as the transmitter 206 in FIG. 2 or the transceiver 1020,1040 in FIG. 1 so the PPDU may be converted to a communication signal (element 410). The transmitter may then transmit the communication signal via the antenna (element 415).

Referring to FIG. 4B, the flowchart 450 begins with a receiver of a station such as the receiver 204 in FIG. 2 receiving a communication signal via one or more antenna(s) such as an antenna element of antenna array 218 (element 455). The receiver may convert the communication signal into one or more MPDUs in accordance with the process described in the preamble (element 460). More specifically, the received signal is fed from the one or more antennas to a DBF such as the DBF 220. The DBF transforms the antenna signals into information signals. The output of the DBF is fed to OFDM such as the OFDM 222. The OFDM extracts signal information from the plurality of subcarriers onto which information-bearing signals are modulated. Then, the demodulator such as the demodulator 224 demodulates the signal information via, e.g., BPSK, 16-QAM, 64-QAM, 256-QAM, QPSK, or SQPSK. And the decoder such as the decoder 226 decodes the signal information from the demodulator via, e.g., BCC or LDPC, to extract the one or more MPDUs (element 460) and transmits the one or more MPDUs to MAC sublayer logic such as MAC sublayer logic 202 (element 465).

The MAC sublayer logic may decode the TIM element in each of the MPDUs. For instance, the MAC sublayer logic may parse the TIM element to determine the value of the TIM segment number field, the page ID field, one or more block offset fields, a block control field for one or more blocks, possibly a block bitmap field, and possibly the sub-block bitmap fields for one or more sub-block bitmaps to determine whether the bit associated with the AID for the receiving station indicates that the AP is buffering data for the station (element 470). In some embodiments, the MAC sublayer logic may determine whether the other fields in the TIM element(s) indicate that the data will be broadcast to a group of devices after receipt of the beacon comprising the TIM element, or if the AP will await a frame from the station instructing the AP to send the frame.

The following examples pertain to further embodiments. One example comprises a method. The method may involve generating, by a medium access control logic, a frame comprising a traffic indication map element, wherein the traffic indication map element comprises a block control field value and a number of contiguous blocks field value, wherein the number of contiguous blocks field value indicates the number of contiguous blocks associated with the block control field value; and encapsulating, by physical layer logic, the frame with a preamble to create a physical layer protocol data unit to transmit.

In some embodiments, the method may further comprise storing, by the medium access control logic, a traffic indication map in a memory in accordance with a hierarchical data structure, the hierarchical data structure assigns stations to sub-blocks, assigns sub-blocks to one or more blocks, and assigns the one or more blocks to one or more pages. In some embodiments, the method may further comprise detecting a number of contiguous blocks in the traffic indication map that are associated with the block control value and determining the number of contiguous blocks value to generate the frame. In many embodiments, generating the frame comprises generating the frame with the block control field value associated with more than one block bitmaps representing the number of contiguous blocks. In several embodiments, generating the frame comprises generating the frame with a block offset field value associated with the more than one block bitmaps representing the number of contiguous blocks, wherein the block offset field value comprises a value indicative of an offset within a page of the traffic indication map. And, in some embodiments, generating the frame comprises generating the frame with a number of contiguous blocks field that is one octet in length.

Another example comprises an apparatus. The apparatus may comprise a memory; a medium access control logic coupled with the memory to generate a frame comprising a traffic indication map element, wherein the traffic indication map element comprises a block control field to indicate an encoding for a block of a page to which the medium access control logic is assigned, wherein the traffic indication map element comprises a number of contiguous blocks field value to indicate the number of contiguous blocks associated with a block offset and the block control field value.

In some embodiments, the apparatus may further comprise a transmitter coupled with the medium access control logic and an antenna to transmit the frame. In some embodiments, the medium access control logic is coupled with the memory to store a traffic indication map in a memory in accordance with a hierarchical data structure, wherein the hierarchical data structure assigns up to eight stations per sub-block, assigns up to eight sub-blocks to per block, and assigns multiple blocks per page to one or more pages. In some embodiments, the medium access control logic comprises logic to detect a number of contiguous blocks in the traffic indication map that are associated with the block control value and to determine the number of contiguous blocks value to generate the frame. In some embodiments, the medium access control logic comprises logic to generate the frame with the block control field value associated with more than one block bitmaps representing the number of contiguous blocks. In some embodiments, the medium access control logic comprises logic to generate frame with a block offset field value associated with the more than one block bitmaps representing the number of contiguous blocks, wherein the block offset field value comprises a value indicative of an offset within a page of the traffic indication map. And in some embodiments of the apparatus, the medium access control logic comprises logic to generate the frame with a number of contiguous blocks field that is one octet in length.

Another example comprises a program product. The program product to generate a traffic indication map element may comprise a storage medium comprising instructions to be executed by a processor-based device, wherein the instructions, when executed by the processor-based device, perform operations, the operations comprising: a storage medium comprising instructions to be executed by a processor-based device, wherein the instructions, when executed by the processor-based device, perform operations, the operations comprising: generating, by a medium access control logic, a frame comprising a traffic indication map element, wherein the traffic indication map element comprises a block control field value and a number of contiguous blocks field value, wherein the number of contiguous blocks field value indicates the number of contiguous blocks associated with the block control field value.

Another example comprises a method. The method may involve receiving, by a medium access control logic of a station, a frame comprising a traffic indication map element, wherein the traffic indication map element comprises a block control field value and a number of contiguous blocks field value, wherein the number of contiguous blocks field value indicates the number of contiguous blocks associated with the block control field value; and decoding, by the medium access control logic, the block control field of the traffic indication map to determine a content of the block.

In some embodiments, the method may further comprise parsing an association identifier from memory, by the medium access control logic, to decode the traffic indication map element to identify a block bitmap within the number of contiguous blocks indicative of a block of the traffic indication map to which the station is assigned. In some embodiments, decoding comprises parsing the block bitmap to determine whether the frame comprises an indication that data is being buffered for the station. In many embodiments, decoding comprises determining the block offset field value to determine a block offset associated with the block bitmap. In several embodiments, decoding comprises determining from the association identifier an offset within the block bitmap indicative of a sub-block of the traffic indication map to which the station is assigned. And, in some embodiments, decoding comprises determining from the association identifier an offset within a sub-block bitmap associated with the block bitmap indicative of a value for the station in the traffic indication map to which the station is assigned, wherein the value indicates whether or not data is being buffered for the station by an access point.

Another example comprises an apparatus. The apparatus may comprise a memory; a medium access control logic coupled with the memory to receive a frame comprising a traffic indication map element, wherein the traffic indication map element comprises a block control field value to indicate an encoding for a block of a page to which medium access control logic is assigned, wherein the traffic indication map element comprises a number of contiguous blocks value to indicate the number of contiguous blocks associated with a block offset value and the block control field value; and to decode the a block offset value and the block control field value of the traffic indication map to determine a content of the block, wherein the block is one of the number of contiguous blocks.

In some embodiments, the medium access control logic comprises logic to parse an association identifier from the memory, by the medium access control logic, to decode the traffic indication map element to identify the block, wherein the association identifier identifies a location within a hierarchical data structure upon which the traffic indication element is based by identifying the page of the hierarchical data structure to which the station is assigned, the block within the page to which the station is assigned and the sub-block within the block to which the station is assigned. In some embodiments, the medium access control logic comprises logic to parse an association identifier from the memory to decode the traffic indication map element to identify a block bitmap within the number of contiguous blocks indicative of the block of the traffic indication map to which the station is assigned. And, in some embodiments, the medium access control logic comprises logic to parse the block bitmap to determine whether the frame comprises an indication that data is being buffered for the station.

Another example comprises a program product. The program product to decode a traffic indication map element may comprise a storage medium comprising instructions to be executed by a processor-based device, wherein the instructions, when executed by the processor-based device, perform operations, the operations comprising: receiving, by a medium access control logic of a station, a frame comprising a traffic indication map element, wherein the traffic indication map element comprises a block control field value and a number of contiguous blocks field value, wherein the number of contiguous blocks field value indicates the number of contiguous blocks associated with the block control field value; and decoding, by the medium access control logic, the block control field of the traffic indication map to determine a content of the block.

In some embodiments of the program product, the operations further comprise parsing an association identifier from memory, by the medium access control logic, to decode the traffic indication map element to identify a block bitmap within the number of contiguous blocks indicative of a block of the traffic indication map to which the station is assigned. In some embodiments of the program product, decoding comprises parsing the block bitmap to determine whether the frame comprises an indication that data is being buffered for the station.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch or the like. A user after via a selectable preference such as a software preference, an e-fuse, or the like may select still further features.

A number of embodiments may have one or more advantageous effects. For instance, some embodiments may offer reduced .MAC header sizes with respect to standard MAC header sizes. Further embodiments may include one or more advantageous effects such as smaller packet sizes for more efficient transmission, lower power consumption due to less data traffic on both the transmitter and receiver sides of communications, less traffic conflicts, less latency awaiting transmission or receipt of packets, and the like.

Another embodiment is implemented as a program product for implementing systems, apparatuses, and methods described with reference to FIGS. 1-5. Embodiments can take the form of an entirely hardware embodiment, a software embodiment implemented via general purpose hardware such as one or more processors and memory, or an embodiment containing both specific-purpose hardware and software elements. One embodiment is implemented in software or code, which includes but is not limited to firmware, resident software, microcode, or other types of executable instructions.

Furthermore, embodiments can take the form of a computer program product accessible from a machine-accessible, computer-usable, or computer-readable medium providing program code for use by or in connection with a computer, mobile device, or any other instruction execution system. For the purposes of this description, a machine-accessible, computer-usable, or computer-readable medium is any apparatus or article of manufacture that can contain, store, communicate, propagate, or transport the program for use by or in connection with the instruction execution system or apparatus.

The medium may comprise an electronic, magnetic, optical, electromagnetic, or semiconductor system medium. Examples of a machine-accessible, computer-usable, or computer-readable medium include memory such as volatile memory and non-volatile memory. Memory may comprise, e.g., a semiconductor or solid-state memory like flash memory, magnetic tape, a removable computer diskette, a random access memory (RAM), a read-only memory (ROM), a rigid magnetic disk, and/or an optical disk. Current examples of optical disks include compact disk-read only memory (CD-ROM), compact disk-read/write memory (CD-R/W), digital video disk (DVD)-read only memory (DVD-ROM), DVD-random access memory (DVD-RAM), DVD-Recordable memory (DVD-R), and DVD-read/write memory (DVD-R/W).

An instruction execution system suitable for storing and/or executing program code may comprise at least one processor coupled directly or indirectly to memory through a system bus. The memory may comprise local memory employed during actual execution of the code, bulk storage such as dynamic random access memory (DRAM), and cache memories which provide temporary storage of at least some code in order to reduce the number of times code must be retrieved from bulk storage during execution.

Input/output or I/O devices (including but not limited to keyboards, displays, pointing devices, etc.) can be coupled to the instruction execution system either directly or through intervening I/O controllers. Network adapters may also be coupled to the instruction execution system to enable the instruction execution system to become coupled to other instruction execution systems or remote printers or storage devices through intervening private or public networks. Modem, Bluetooth™, Ethernet, Wi-Fi, and WiDi adapter cards are just a few of the currently available types of network adapters.

What is claimed is:

1. A method comprising:
    generating, by a medium access control (MAC) logic, a MAC frame comprising a traffic indication map element, wherein the traffic indication map element comprises a block control field value, a block offset field value, and a length of contiguous sub-blocks value, wherein the block control field value indicates an encoding for a block of a page and the length of contiguous sub-blocks value indicates a number of contiguous sub-block bitmaps associated with the block control field value, wherein the block offset field value comprises a value indicative of an offset within a page of the traffic indication map, the traffic indication map having a hierarchical data structure, wherein the hierarchical data structure assigns stations to sub-blocks, assigns sub-blocks to blocks, and assigns blocks to pages; and
    using, by physical layer logic, the MAC frame to create a physical layer PDU including a preamble.

2. The method of claim 1, further comprising storing, by the MAC logic, a traffic indication map in a memory.

3. The method of claim 1, further comprising detecting a number of contiguous blocks in the traffic indication map that are associated with the block control value and determining the number of contiguous blocks to generate the frame.

4. The method of claim 1, wherein generating the frame comprises generating the frame with the block control field value associated with more than one bitmaps representing a number of contiguous blocks.

5. The method of claim 4, wherein generating the frame comprises generating the frame with a block offset field value associated with the more than one bitmaps representing the number of contiguous blocks.

6. The method of claim 1, wherein generating the frame comprises generating the frame with a number of contiguous blocks field that is one octet in length.

7. A device comprising:
    a memory;
    a medium access control (MAC) logic coupled with the memory to generate a MAC frame comprising a traffic indication map element, wherein the traffic indication map element comprises a block control field to indicate an encoding for a block of a page and a block offset field value, wherein the traffic indication map element comprises a length of contiguous sub-blocks value to indicate a number of contiguous sub-block bitmaps associated with a block offset and the block control field value, wherein the block offset field value comprises a value indicative of an offset within a page of the traffic indication map, the traffic indication map having a hierarchical data structure, wherein the hierarchical data structure assigns stations to sub-blocks, assigns sub-blocks to blocks, and assigns blocks to pages, wherein the MAC logic comprises a processor;
    a physical layer logic comprising hardware coupled to the memory to prepend the MAC frame with a preamble to create a physical layer protocol data unit to transmit; and
    a transmitter coupled with the MAC logic to transmit the frame.

8. The device of claim 7, further comprising a processor, radio, and one or more antennas coupled with the transmitter coupled with the MAC logic to transmit the frame.

9. The device of claim 7, wherein the MAC logic comprises logic to detect a number of contiguous blocks in the traffic indication map that are associated with the block control value and to determine the number of contiguous blocks value to generate the frame.

10. The device of claim 7, wherein the MAC logic comprises logic to generate the frame with the block control field value associated with more than one bitmaps representing a number of contiguous blocks.

11. The device of claim 7, wherein the MAC logic comprises logic to generate frame with a block offset field value associated with the more than one bitmaps representing a number of contiguous blocks.

12. The device of claim 7, wherein the MAC logic comprises logic to generate the frame with a number of contiguous blocks field that is one octet in length.

13. A program product to generate a traffic indication map element, the program product comprising a non-transitory storage medium comprising instructions to be executed by a processor-based device, wherein the instructions, when executed by the processor-based device, perform operations, the operations comprising:

generating, by a medium access control (MAC) logic, a frame comprising a traffic indication map element, wherein the traffic indication map element comprises a block control field value, a block offset field value, and a length of contiguous sub-blocks value, wherein the block control field value indicates an encoding for a block of a page and the length of contiguous sub-blocks value indicates a number of contiguous sub-block bitmaps associated with the block control field value, wherein the block offset field value comprises a value indicative of an offset within a page of the traffic indication map, the traffic indication map having a hierarchical data structure, wherein the hierarchical data structure assigns stations to sub-blocks, assigns sub-blocks to blocks, and assigns blocks to pages.

14. The program product of claim 13, wherein the operations further comprise detecting a number of contiguous blocks in the traffic indication map that are associated with the block control value and determining the number of contiguous blocks value to generate the frame.

15. The program product of claim 13, wherein generating the frame comprises generating the frame with the block control field value associated with more than one bitmaps representing a number of contiguous blocks.

16. The program product of claim 15, generating the frame comprises generating the frame with a block offset field value associated with the more than one bitmaps representing the number of contiguous blocks.

17. A method comprising:

receiving, by a medium access control (MAC) logic of a station, a frame comprising a traffic indication map element, wherein the traffic indication map element comprises a block control field value, a block offset field value, and a length of contiguous sub-blocks value, wherein the block control field value indicates an encoding for a block of a page and the length of contiguous sub-blocks value indicates a number of contiguous sub-block bitmaps associated with the block control field value, wherein the block offset field value comprises a value indicative of an offset within a page of the traffic indication map, the traffic indication map having a hierarchical data structure, wherein the hierarchical data structure assigns stations to sub-blocks, assigns sub-blocks to blocks, and assigns blocks to pages; and decoding, by the MAC logic, the block control field of the traffic indication map to determine a content of the block.

18. The method of claim 17, further comprising parsing an association identifier from memory, by the MAC logic, to decode the traffic indication map element to identify a bitmap of a block of the traffic indication map to which the station is assigned.

19. The method of claim 18, wherein decoding comprises parsing the bitmap to determine whether the frame comprises an indication that data is being buffered for the station.

20. The method of claim 18, wherein decoding comprises determining the block offset field value to determine a block offset associated with a bitmap.

21. The method of claim 18, wherein decoding comprises determining from the association identifier an offset within the bitmap indicative of a sub-block of the traffic indication map to which the station is assigned.

22. The method of claim 18, wherein decoding comprises determining, from the association identifier, an offset within a sub-block bitmap, in the traffic indication map to which the station is assigned, wherein a value at the offset indicates whether or not data is being buffered for the station by an access point.

23. A device comprising:

a memory;

a medium access control (MAC) logic coupled with the memory to receive a frame comprising a traffic indication map element, wherein the traffic indication map element comprises a block control field value to indicate an encoding for a block of a page, wherein the traffic indication map element comprises a block offset value, wherein the traffic indication map element comprises a length of contiguous sub-blocks value to indicate a number of contiguous sub-block bitmaps associated with the block offset value and the block control field value; and to decode the block offset value and the block control field value of the traffic indication map to determine a content of the block, wherein the block offset value comprises a value indicative of an offset within a page of the traffic indication map, the traffic indication map having a hierarchical data structure, wherein the hierarchical data structure assigns stations to sub-blocks, assigns sub-blocks to blocks, and assigns blocks to pages, wherein the MAC logic comprises a processor.

24. The device of claim 23, wherein the MAC logic comprises logic to parse an association identifier from the memory, by the MAC logic, to decode the traffic indication map element to identify the block, wherein the association identifier identifies a location within a hierarchical data structure upon which the traffic indication element is based by identifying the page of the hierarchical data structure to which the station is assigned, the block within the page to which the station is assigned and the sub-block within the block to which the station is assigned.

25. The device of claim 23, wherein the MAC logic comprises logic to parse an association identifier from the memory to decode the traffic indication map element to identify a bitmap of the block of the traffic indication map to which the station is assigned.

26. The device of claim 25, wherein the MAC comprises logic to parse the bitmap to determine whether the frame comprises an indication that data is being buffered for the station.

27. A program product to decode a traffic indication map element, the program product comprising a non-transitory storage medium comprising instructions to be executed by a processor-based device, wherein the instructions, when executed by the processor-based device, perform operations, the operations comprising:

receiving, by a MAC logic of a station, a frame comprising a traffic indication map element, wherein the traffic indication map element comprises a block control field value, a block offset field value, and a length of contiguous sub-blocks value, wherein the block control field value indicates an encoding for a block of a page and the length of contiguous sub-blocks value indicates a number of contiguous sub-block bitmaps associated with the block control field value, the traffic indication map having a hierarchical data structure, wherein the hierarchical data structure assigns stations to sub-blocks, assigns sub-blocks to blocks, and assigns blocks to pages; and decoding, by the MAC logic, the block control field of the traffic indication map to determine a content of the block.

28. The program product of claim 27, wherein the operations further comprise parsing an association identifier from memory, by the MAC logic, to decode the traffic indication map element to identify a bitmap of a block of the traffic indication map to which the station is assigned.

29. The program product of claim 28, wherein decoding comprises parsing the bitmap to determine whether the frame comprises an indication that data is being buffered for the station.

* * * * *